US012413486B1

(12) United States Patent
Cruz

(10) Patent No.: US 12,413,486 B1
(45) Date of Patent: Sep. 9, 2025

(54) TELECOMMUNICATIONS SYSTEM TO TIMELY SEND PRODUCER NETWORK FUNCTION STATUS NOTIFICATIONS TO CONSUMER NETWORK FUNCTIONS

(71) Applicant: T-Mobile USA, Inc., Bellevue, WA (US)

(72) Inventor: John Paul Cruz, Renton, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 18/601,038

(22) Filed: Mar. 11, 2024

(51) Int. Cl.
*H04L 41/50* (2022.01)
*H04L 41/40* (2022.01)

(52) U.S. Cl.
CPC .............. *H04L 41/50* (2013.01); *H04L 41/40* (2022.05)

(58) Field of Classification Search
CPC .................................. H04L 41/50; H04L 41/40
See application file for complete search history.

(56) References Cited

U.S. PATENT DOCUMENTS

| | | | |
|---|---|---|---|
| 9,582,306 | B2 | 2/2017 | Dowlatkhah et al. |
| 9,806,893 | B2 | 10/2017 | Lee |
| 9,952,888 | B2 | 4/2018 | Dowlatkhah et al. |
| 10,581,984 | B2 | 3/2020 | Livanos et al. |
| 10,609,530 | B1 | 3/2020 | Patil et al. |
| 10,778,527 | B2 | 9/2020 | Assali et al. |
| 10,791,044 | B1 | 9/2020 | Krishan et al. |
| 10,833,938 | B1 | 11/2020 | Rajput et al. |
| 10,848,576 | B2 | 11/2020 | Stammers et al. |
| 11,026,074 | B2 | 6/2021 | Patil et al. |
| 11,064,325 | B2 | 7/2021 | BartoloméRodrigo et al. |
| 11,140,231 | B2 | 10/2021 | Cakulev et al. |
| 11,265,694 | B2 | 3/2022 | Farooq |
| 11,271,846 | B2 | 3/2022 | Krishan |
| 11,277,306 | B2 | 3/2022 | Xu et al. |
| 11,310,151 | B2 | 4/2022 | Taft et al. |
| 11,405,861 | B2 | 8/2022 | Regnault et al. |
| 11,418,942 | B2 | 8/2022 | Sridharan et al. |
| 11,425,636 | B1 | 8/2022 | Aggarwal et al. |
| 11,483,694 | B2 | 10/2022 | Krishan |

(Continued)

FOREIGN PATENT DOCUMENTS

| | | |
|---|---|---|
| CN | 101772767 A | 7/2010 |
| CN | 105745911 B | 3/2019 |

(Continued)

*Primary Examiner* — Richard G Keehn
(74) *Attorney, Agent, or Firm* — Perkins Coie LLP

(57) ABSTRACT

A 5G telecommunications network system for sending timely status notifications regarding network functions. The system includes at least two network repository functions (NRF), a consumer network function (CNF), and a producer network function (PNF). The CNF creates a subscription with the first NRF to receive updates about the PNF. The first NRF, upon detecting loss of connectivity to a PNF previously connected to it and upon learning from a second NRF that the PNF is now connected to the peer NRF, the first NRF notifies a CNF that was subscribed to receive updates about the PNF that the PNF is now connected to the peer NRF. As such, the CNF does not have to wait until the expiry of a Subscription Validity Timer to reconnect to the PNF. Instead, the CNF can immediately establish connection with the PNF through the second NRF.

20 Claims, 5 Drawing Sheets

(56) References Cited

U.S. PATENT DOCUMENTS

| | | |
|---|---|---|
| 11,509,728 B2 | 11/2022 | Landais et al. |
| 11,528,334 B2 | 12/2022 | Krishan |
| 11,558,732 B1 | 1/2023 | Malhotra et al. |
| 11,563,638 B1 | 1/2023 | Jayaramachar et al. |
| 11,570,262 B2 | 1/2023 | Sapra et al. |
| 11,570,689 B2 | 1/2023 | Rajput et al. |
| 11,589,298 B2 | 2/2023 | Sapra et al. |
| 11,601,367 B2 | 3/2023 | Delos Reyes et al. |
| 11,611,626 B1 | 3/2023 | Srivastava et al. |
| 11,616,711 B1 | 3/2023 | Cakulev et al. |
| 11,659,024 B2 | 5/2023 | Yang |
| 11,706,606 B2 | 7/2023 | Farooq |
| 11,716,252 B2 | 8/2023 | Rajput et al. |
| 11,716,646 B2 | 8/2023 | Yao et al. |
| 11,743,363 B1 | 8/2023 | Goel |
| 11,743,699 B2 | 8/2023 | BartoloméRodrigo et al. |
| 11,784,762 B2 | 10/2023 | Jayaramachar et al. |
| 11,792,626 B2 | 10/2023 | Flinck et al. |
| 11,805,400 B2 | 10/2023 | Cakulev et al. |
| 2021/0144076 A1* | 5/2021 | Lee .................. H04L 41/142 |
| 2021/0234934 A1 | 7/2021 | Xia |
| 2021/0306842 A1 | 9/2021 | Rivas Molina et al. |
| 2021/0385734 A1 | 12/2021 | Keller et al. |
| 2022/0038999 A1 | 2/2022 | Sapra et al. |
| 2022/0095111 A1 | 3/2022 | Fu et al. |
| 2022/0103644 A1* | 3/2022 | Park .................. H04L 41/14 |
| 2022/0224589 A1 | 7/2022 | Das et al. |
| 2022/0248316 A1 | 8/2022 | Castellanos Zamora et al. |
| 2022/0264286 A1 | 8/2022 | Gupta et al. |
| 2022/0272165 A1 | 8/2022 | Bawa et al. |
| 2022/0272537 A1 | 8/2022 | Aggarwal et al. |
| 2022/0295386 A1 | 9/2022 | Lu et al. |
| 2022/0295439 A1 | 9/2022 | Zheng |
| 2022/0338104 A1 | 10/2022 | Son et al. |
| 2022/0345913 A1 | 10/2022 | Al-dulaimi et al. |
| 2022/0353263 A1 | 11/2022 | Choyi et al. |
| 2022/0353802 A1 | 11/2022 | Gupta et al. |
| 2023/0006888 A1 | 1/2023 | Turina et al. |
| 2023/0007536 A1 | 1/2023 | Sharma |
| 2023/0030315 A1 | 2/2023 | Khare et al. |
| 2023/0032054 A1 | 2/2023 | Jayaramachar et al. |
| 2023/0090068 A1 | 3/2023 | Rajput et al. |
| 2023/0092029 A1 | 3/2023 | Malhotra et al. |
| 2023/0124206 A1 | 4/2023 | Khare et al. |
| 2023/0180056 A1 | 6/2023 | Krishan |
| 2023/0188972 A1* | 6/2023 | Goel .................. H04W 8/18 370/328 |
| 2023/0232322 A1 | 7/2023 | Singh et al. |
| 2023/0239680 A1* | 7/2023 | Park .................. H04L 41/14 370/329 |
| 2023/0262025 A1 | 8/2023 | Krishan et al. |
| 2023/0269608 A1 | 8/2023 | Puente Pestaña |
| 2023/0275974 A1 | 8/2023 | Rodrigo et al. |
| 2023/0284292 A1 | 9/2023 | Hellgren et al. |
| 2023/0292274 A1 | 9/2023 | Jayaramachar et al. |
| 2023/0353657 A1* | 11/2023 | Krishan ............. H04L 45/74 |
| 2024/0298196 A1* | 9/2024 | Yang .................. H04L 41/0654 |
| 2025/0039064 A1* | 1/2025 | Sung .................. H04L 41/14 |

FOREIGN PATENT DOCUMENTS

| | | |
|---|---|---|
| CN | 109952741 A | 6/2019 |
| CN | 111095970 A | 5/2020 |
| CN | 111201765 A | 5/2020 |
| CN | 111226497 A | 6/2020 |
| CN | 110730487 B | 12/2020 |
| CN | 112399553 A | 2/2021 |
| CN | 108092789 B | 3/2021 |
| CN | 112514328 A | 3/2021 |
| CN | 112544055 A | 3/2021 |
| CN | 112567685 A | 3/2021 |
| CN | 112586060 A | 3/2021 |
| CN | 112602342 A | 4/2021 |
| CN | 112913211 A | 6/2021 |
| CN | 112956223 A | 6/2021 |
| CN | 112997513 A | 6/2021 |
| CN | 110710157 B | 7/2021 |
| CN | 113453280 A | 9/2021 |
| CN | 109995844 B | 11/2021 |
| CN | 111386677 B | 2/2022 |
| CN | 110999346 B | 3/2022 |
| CN | 111052711 B | 8/2022 |
| CN | 111385262 B | 8/2022 |
| CN | 111328110 B | 9/2022 |
| CN | 112868206 B | 9/2022 |
| CN | 109792598 B | 1/2023 |
| CN | 110603837 B | 4/2023 |
| CN | 113647062 B | 4/2023 |
| CN | 114008980 B | 4/2023 |
| CN | 111034238 B | 6/2023 |
| CN | 113647077 B | 7/2023 |
| CN | 112056003 B | 9/2023 |
| CN | 113966625 B | 9/2023 |
| CN | 111201823 B | 10/2023 |
| EP | 1865448 A1 | 12/2007 |
| EP | 2036248 A1 | 3/2009 |
| EP | 3523923 A1 | 8/2019 |
| EP | 3659394 A1 | 6/2020 |
| EP | 3714584 A1 | 9/2020 |
| EP | 3777448 A1 | 2/2021 |
| EP | 3780493 A1 | 2/2021 |
| EP | 3782351 A1 | 2/2021 |
| EP | 3831042 A1 | 6/2021 |
| EP | 3843341 A1 | 6/2021 |
| EP | 3669560 B1 | 7/2021 |
| EP | 3855705 A1 | 7/2021 |
| EP | 3669561 B1 | 8/2021 |
| EP | 3886390 A1 | 9/2021 |
| EP | 3886482 A1 | 9/2021 |
| EP | 3729841 B1 | 11/2021 |
| EP | 3937521 A1 | 1/2022 |
| EP | 3944646 A1 | 1/2022 |
| EP | 4025012 A1 | 7/2022 |
| EP | 4030685 A1 | 7/2022 |
| EP | 3639571 B1 | 10/2022 |
| EP | 3679707 B1 | 12/2022 |
| EP | 3669275 B1 | 3/2023 |
| EP | 3603238 B1 | 7/2023 |
| EP | 3852339 B1 | 8/2023 |
| EP | 3729783 B1 | 9/2023 |
| EP | 3905738 B1 | 10/2023 |
| JP | 5425070 B2 | 12/2013 |
| JP | 6416895 B2 | 10/2018 |
| JP | 6479989 B2 | 2/2019 |
| JP | 2020530703 A | 10/2020 |
| JP | 6900481 B2 | 6/2021 |
| JP | 6979520 B2 | 11/2021 |
| JP | 6992050 B2 | 12/2021 |
| JP | 7009629 B2 | 1/2022 |
| JP | 7171729 B2 | 11/2022 |
| JP | 7197574 B2 | 12/2022 |
| KR | 19990078519 A | 11/1999 |
| KR | 101470991 B1 | 12/2014 |
| KR | 20170119296 A | 10/2017 |
| KR | 101868918 B1 | 7/2018 |
| KR | 20190088060 A | 7/2019 |
| KR | 20190088878 A | 7/2019 |
| KR | 20200077829 A | 7/2020 |
| KR | 20200100073 A | 8/2020 |
| KR | 20200116845 A | 10/2020 |
| KR | 102217145 B1 | 2/2021 |
| KR | 20210069105 A | 6/2021 |
| KR | 20210075171 A | 6/2021 |
| KR | 20210108785 A | 9/2021 |
| KR | 20210144535 A | 11/2021 |
| KR | 102435830 B1 | 8/2022 |
| KR | 102437811 B1 | 8/2022 |
| KR | 20230039746 A | 3/2023 |
| KR | 102544113 B1 | 6/2023 |
| WO | 2018067780 A1 | 4/2018 |
| WO | 2018175498 A1 | 9/2018 |
| WO | 2019034268 A1 | 2/2019 |
| WO | 2019034609 A1 | 2/2019 |

(56) References Cited

FOREIGN PATENT DOCUMENTS

| | | |
|---|---|---|
| WO | 2019034610 A1 | 2/2019 |
| WO | 2019162862 A1 | 8/2019 |
| WO | 2020074126 A1 | 4/2020 |
| WO | 2020083516 A1 | 4/2020 |
| WO | 2020091934 A1 | 5/2020 |
| WO | 2020098974 A1 | 5/2020 |
| WO | 2020099958 A1 | 5/2020 |
| WO | 2020141356 A1 | 7/2020 |
| WO | 2020146327 A1 | 7/2020 |
| WO | 2020156685 A1 | 7/2020 |
| WO | 2020169337 A1 | 8/2020 |
| WO | 2020171899 A1 | 8/2020 |
| WO | 2020174119 A1 | 9/2020 |
| WO | 2020254903 A1 | 12/2020 |
| WO | 2020260187 A1 | 12/2020 |
| WO | 2021008716 A1 | 1/2021 |
| WO | 2021011933 A1 | 1/2021 |
| WO | 2021013321 A1 | 1/2021 |
| WO | 2021018460 A1 | 2/2021 |
| WO | 2021028435 A1 | 2/2021 |
| WO | 2021031770 A1 | 2/2021 |
| WO | 2021104636 A1 | 6/2021 |
| WO | 2021140272 A1 | 7/2021 |
| WO | 2021150153 A1 | 7/2021 |
| WO | 2021160547 A1 | 8/2021 |
| WO | 2021194471 A1 | 9/2021 |
| WO | 2021197773 A1 | 10/2021 |
| WO | 2021224545 A1 | 11/2021 |
| WO | 2021234639 A1 | 12/2021 |
| WO | 2021240055 A1 | 12/2021 |
| WO | 2021251948 A1 | 12/2021 |
| WO | 2022005037 A1 | 1/2022 |
| WO | 2022152406 A1 | 7/2022 |
| WO | 2022152484 A1 | 7/2022 |
| WO | 2022152870 A1 | 7/2022 |
| WO | 2023052596 A1 | 4/2023 |

\* cited by examiner

TELECOMMUNICATIONS SYSTEM TO TIMELY SEND PRODUCER NETWORK FUNCTION STATUS NOTIFICATIONS TO CONSUMER NETWORK FUNCTIONS

BACKGROUND

Network functions virtualization (NFV) is a network architecture concept that leverages Information Technology (IT) virtualization technologies to virtualize entire classes of network node functions into building blocks that may connect, or chain together, to create and deliver communication services. NFV relies upon traditional server-virtualization techniques such as those used in enterprise IT. A virtualized network function, or VNF, is implemented within one or more virtual machines or containers running different software and processes on top of commercial off-the-shelf (COTS) high-volume servers, switches, and storage devices, or even cloud computing infrastructure, instead of having custom hardware appliances for each network function, thereby avoiding vendor lock-in.

A service provider that follows the NFV design implements one or more VNFs. A VNF by itself does not automatically provide a usable product or service to the provider's customers. To build more complex services, the notion of service chaining is used, where multiple VNFs are used in sequence to deliver a service. Another aspect of implementing NFV is the orchestration process. To build highly reliable and scalable services, NFV requires that the network be able to instantiate VNF instances, monitor them, repair them, and bill for the services rendered. These attributes, referred to as carrier-grade features, are allocated to an orchestration layer in order to provide high availability and security and low operation and maintenance costs.

BRIEF DESCRIPTION OF THE DRAWINGS

Detailed descriptions of implementations of the present invention will be described and explained through the use of the accompanying drawings.

Figure 1:
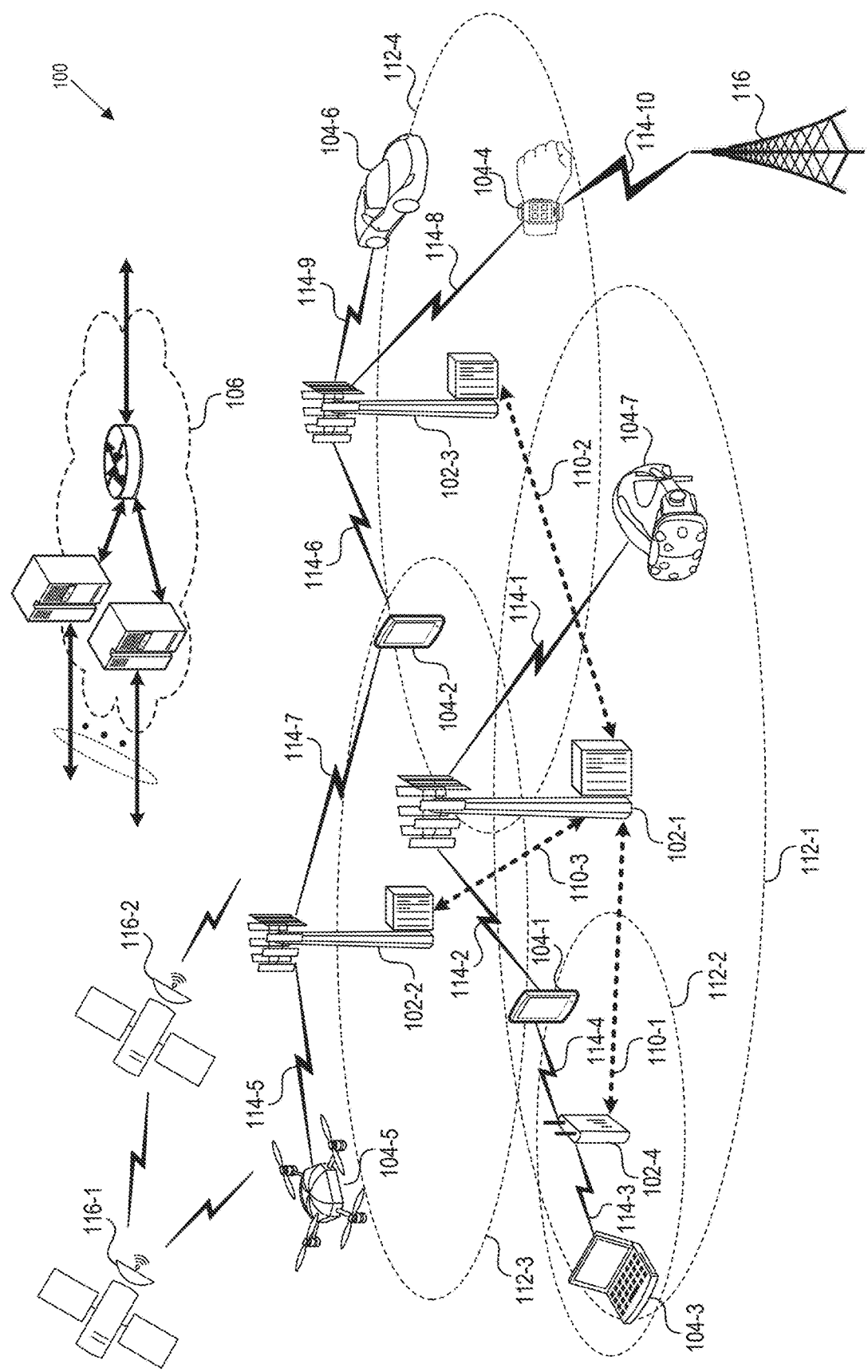
FIG. 1 is a block diagram that illustrates a wireless communications system that can implement aspects of the present technology.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

The disclosed technology relates to a telecommunications system comprising at least four network functions in a 5G network that employs a Service-Based Architecture (SBA). The system enables a first network function, upon learning from a second and a third network function about a change in availability of the third network function, to notify a fourth network function about the change. The scheme enables the fourth network function, upon receiving the notification, to timely establish service connectivity with the third network function, thereby minimizing service impairment to users of the 5G network.

In a 5G network employing an SBA, 5G control plane functionality and common data repositories are delivered through a set of interconnected NFs, with each NF authorized to access the services of other NFs. The SBA includes at least one type of NF and at least one network repository function (NRF). In some implementations, the at least one NF and the at least one NRF may be virtualized to run on COTS hardware. Optionally, the 5G network can contain more than one instance of each NF and more than one instance of NRF, each multilaterally coupled with other instances of NFs and NRFs to provide geographical and operational redundancy. Each NF assumes the role of a service producer or a service consumer. Each NRF instance maintains a repository of network function profiles of available NF instances in the network. A network function profile can include important information such as the NF type and the notification subscriptions associated with each NF. The NRF receives NF discovery requests from network function consumer instances and responds with information of available NF producer instances that satisfy the criteria in the request. A consumer network function (CNF) can create a subscription with an NRF to receive notifications about any changes related to a producer NF (PNF). The notifications may include, for example, whether the PNF is registered or deregistered with the NRF. When a PNF is no longer registered with an NRF, the NRF deletes the notification subscription created with it for that PNF by a CNF. Upon discovering that the PNF is no longer registered with the NRF, the CNF initiates a configurable timer during which it retries obtaining service from the PNF. Upon expiry of the configurable timer, if the CNF has still not received service from the PNF, the CNF initiates a new NF discovery request to the NRF to obtain information about other available PNFs.

The current technology discloses a system wherein an NRF with which a CNF has created a subscription notification for a PNF retains that subscription information even when the PNF has deregistered with that NRF. Later, upon learning from another NRF that the deregistered PNF has subsequently registered with the other NRF, the original NRF uses the retained subscription notification information to notify the CNF about the PNF's reregistration with the other NRF. Without having to wait until its configurable timer expires, the CNF then initiates connection with the PNF that is registered with the new NRF, thereby preventing user service impairment until the end of the configurable timer.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail to avoid unnecessarily obscuring the descriptions of examples.

Wireless Communications System

FIG. 1 is a block diagram that illustrates a wireless telecommunication network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, internet protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The coverage area 112 for a base station 102 can be divided into sectors making up only a portion of the coverage area (not shown). The network 100 can include base stations of different types (e.g., macro and/or small cell base stations). In some implementations, there can be overlapping coverage areas 112 for different service environments (e.g., Internet of Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term "eNBs" is used to describe the base stations 102, and in 5G new radio (NR) networks, the term "gNBs" is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the network 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (AR/VR) connectivity 104-7; portable gaming consoles; wireless routers, gateways, modems, and other fixed-wireless access devices; wirelessly connected sensors that provide data to a remote server over a network; IoT devices such as wirelessly connected smart home appliances; etc.

A wireless device (e.g., wireless devices 104) can be referred to as a user equipment (UE), a customer premises equipment (CPE), a mobile station, a subscriber station, a mobile unit, a subscriber unit, a wireless unit, a remote unit, a handheld mobile device, a remote device, a mobile subscriber station, a terminal equipment, an access terminal, a mobile terminal, a wireless terminal, a remote terminal, a handset, a mobile client, a client, or the like.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102 and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

In some examples, the network 100 implements 6G technologies including increased densification or diversification of network nodes. The network 100 can enable terrestrial and non-terrestrial transmissions. In this context, a Non-Terrestrial Network (NTN) is enabled by one or more satellites, such as satellites 116-1 and 116-2, to deliver services anywhere and anytime and provide coverage in areas that are unreachable by any conventional Terrestrial Network (TN). A 6G implementation of the network 100 can support terahertz (THz) communications. This can support wireless applications that demand ultrahigh quality of service (QOS) requirements and multi-terabits-per-second data transmission in the era of 6G and beyond, such as terabit-per-second backhaul systems, ultra-high-definition content streaming among mobile devices, AR/VR, and wireless high-bandwidth secure communications. In another example of 6G, the network 100 can implement a converged Radio Access Network (RAN) and Core architecture to achieve Control and User Plane Separation (CUPS) and achieve extremely low user plane latency. In yet another example of 6G, the network 100 can implement a converged Wi-Fi and Core architecture to increase and improve indoor coverage.

5G Core Network Functions

Figure 2:
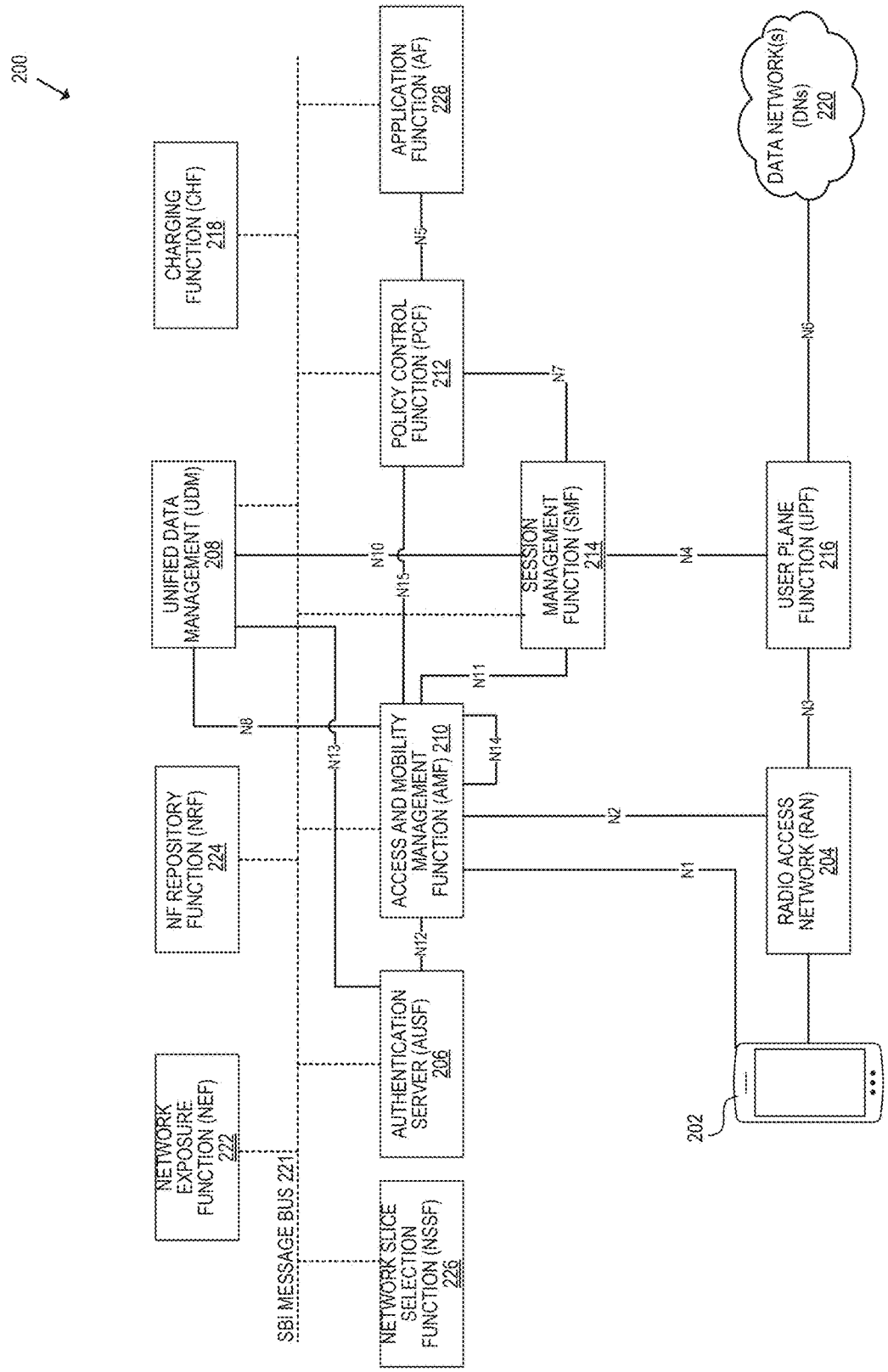
FIG. 2 is a block diagram that illustrates 5G core network functions (NFs) that can implement aspects of the present technology.

FIG. 2 is a block diagram that illustrates an architecture 200 including 5G core network functions (NFs) that can implement aspects of the present technology. A wireless device 202 can access the 5G network through a NAN (e.g., gNB) of a RAN 204. The NFS include an Authentication Server Function (AUSF) 206, a Unified Data Management (UDM) 208, an Access and Mobility management Function (AMF) 210, a Policy Control Function (PCF) 212, a Session Management Function (SMF) 214, a User Plane Function (UPF) 216, and a Charging Function (CHF) 218.

The interfaces N1 through N15 define communications and/or protocols between each NF as described in relevant standards. The UPF 216 is part of the user plane and the AMF 210, SMF 214, PCF 212, AUSF 206, and UDM 208 are part of the control plane. One or more UPFs can connect with one or more data networks (DNs) 220. The UPF 216 can be deployed separately from control plane functions. The NFs of the control plane are modularized such that they can be scaled independently. As shown, each NF service exposes its functionality in a Service Based Architecture (SBA) through a Service Based Interface (SBI) 221 that uses HTTP/2. The SBA can include a Network Exposure Function (NEF) 222, an NF Repository Function (NRF) 224, a Network Slice Selection Function (NSSF) 226, and other functions such as a Service Communication Proxy (SCP).

The SBA can provide a complete service mesh with service discovery, load balancing, encryption, authentication, and authorization for interservice communications. The SBA employs a centralized discovery framework that leverages the NRF 224, which maintains a record of available NF instances and supported services. The NRF 224 allows other NF instances to subscribe and be notified of registrations from NF instances of a given type. The NRF 224 supports service discovery by receipt of discovery requests from NF instances and, in response, details which NF instances support specific services.

The NSSF 226 enables network slicing, which is a capability of 5G to bring a high degree of deployment flexibility and efficient resource utilization when deploying diverse network services and applications. A logical end-to-end (E2E) network slice has pre-determined capabilities, traffic characteristics, and service-level agreements and includes the virtualized resources required to service the needs of a Mobile Virtual Network Operator (MVNO) or group of subscribers, including a dedicated UPF, SMF, and PCF. The wireless device 202 is associated with one or more network slices, which all use the same AMF. A Single Network Slice Selection Assistance Information (S-NSSAI) function operates to identify a network slice. Slice selection is triggered by the AMF, which receives a wireless device registration request. In response, the AMF retrieves permitted network slices from the UDM 208 and then requests an appropriate network slice of the NSSF 226.

The UDM 208 introduces a User Data Convergence (UDC) that separates a User Data Repository (UDR) for storing and managing subscriber information. As such, the UDM 208 can employ the UDC under 3GPP TS 22.101 to support a layered architecture that separates user data from application logic. The UDM 208 can include a stateful message store to hold information in local memory or can be stateless and store information externally in a database of the UDR. The stored data can include profile data for subscribers and/or other data that can be used for authentication purposes. Given a large number of wireless devices that can connect to a 5G network, the UDM 208 can contain voluminous amounts of data that is accessed for authentication. Thus, the UDM 208 is analogous to a Home Subscriber Server (HSS) and can provide authentication credentials while being employed by the AMF 210 and SMF 214 to retrieve subscriber data and context.

The PCF 212 can connect with one or more Application Functions (AFs) 228. The PCF 212 supports a unified policy framework within the 5G infrastructure for governing network behavior. The PCF 212 accesses the subscription information required to make policy decisions from the UDM 208 and then provides the appropriate policy rules to the control plane functions so that they can enforce them. The SCP (not shown) provides a highly distributed multi-access edge compute cloud environment and a single point of entry for a cluster of NFs once they have been successfully discovered by the NRF 224. This allows the SCP to become the delegated discovery point in a datacenter, offloading the NRF 224 from distributed service meshes that make up a network operator's infrastructure. Together with the NRF 224, the SCP forms the hierarchical 5G service mesh.

The AMF 210 receives requests and handles connection and mobility management while forwarding session management requirements over the N11 interface to the SMF 214. The AMF 210 determines that the SMF 214 is best suited to handle the connection request by querying the NRF 224. That interface and the N11 interface between the AMF 210 and the SMF 214 assigned by the NRF 224 use the SBI 221. During session establishment or modification, the SMF 214 also interacts with the PCF 212 over the N7 interface and the subscriber profile information stored within the UDM 208. Employing the SBI 221, the PCF 212 provides the foundation of the policy framework that, along with the more typical QoS and charging rules, includes network slice selection, which is regulated by the NSSF 226.

System for Timely Sending Network Function Status Notifications

Figure 3A:
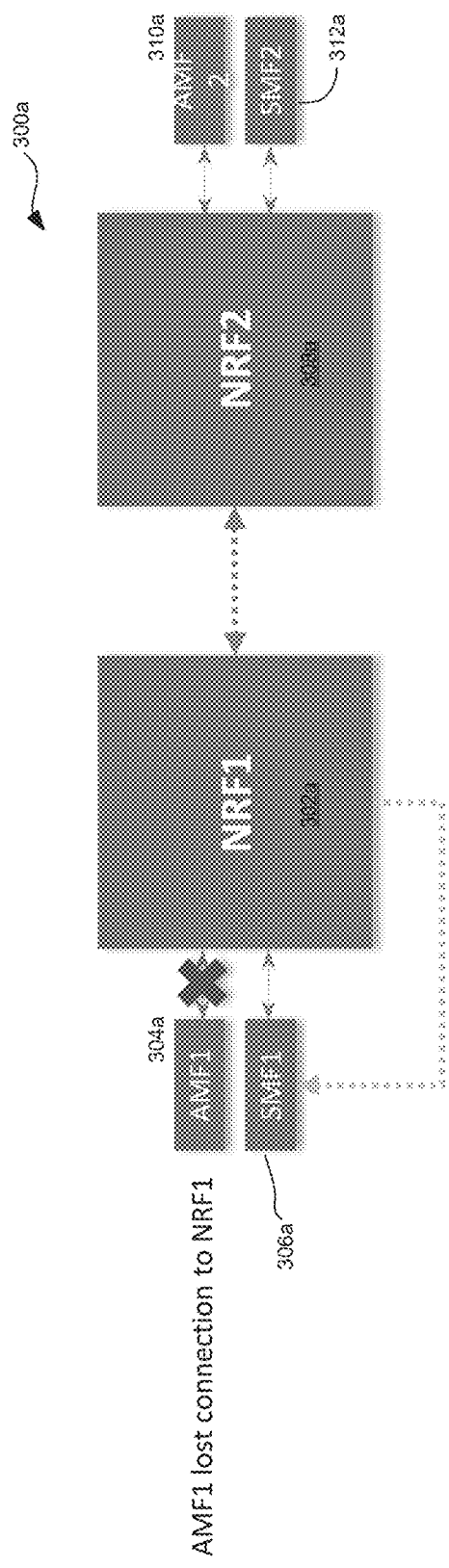
FIG. 3A is a block diagram that illustrates an example of a system of a 5G core network.

FIG. 3A is a block diagram that illustrates an example of a telecommunications network system. As shown, the telecommunications network system 300a can include two or more network repository functions (NRF1) 302a and (NRF2) 308a, at least one consumer network function, and at least one producer network function connected to each NRF. Access and Mobility Management Functions AMF1 304a and AMF2 310a are examples of producer network functions (PNFs) connected to NRF1 302a and NRF2 308a, respectively. Session Management Functions SMF1 306a and SMF2 312a are examples of consumer network functions connected to NRF1 302a and NRF2 308a, respectively. SMF1 306a performs AMF discovery on NRF1 302a, since based on its local configuration, NRF1 302a has the highest priority.

SMF1 306a then requests NRF1 302a to create a subscription for AMF1 304a on NRF1 302a. The subscription can include information regarding AMF1 304a such as callback Uniform Resource Identifier (URI), notification type, and a Subscription Validity Timer that indicates the duration for which the subscription will stay active. NRF1 302a acknowledges the request by sending back data to SMF1 306a related to the created subscription. Once the Subscription Validity Timer expires, SMF1 304a creates a new subscription or optionally updates the existing subscription to extend the subscription.

If AMF1 304a loses connectivity to NRF1 302a, it does not send any heartbeat messages to NRF1 302a indicating that the connection is active. NRF1 302a then sends a suspend notification message to SMF1 306a as it has an active subscription for AMF1 304a. SMF1 306a marks AMF1 304a as unavailable for usage and updates its internal cache. NRF2 308a may have other consumer network functions such as SMF2 312a and other PNFs such as AMF2 310a connected to it.

Figure 3B:
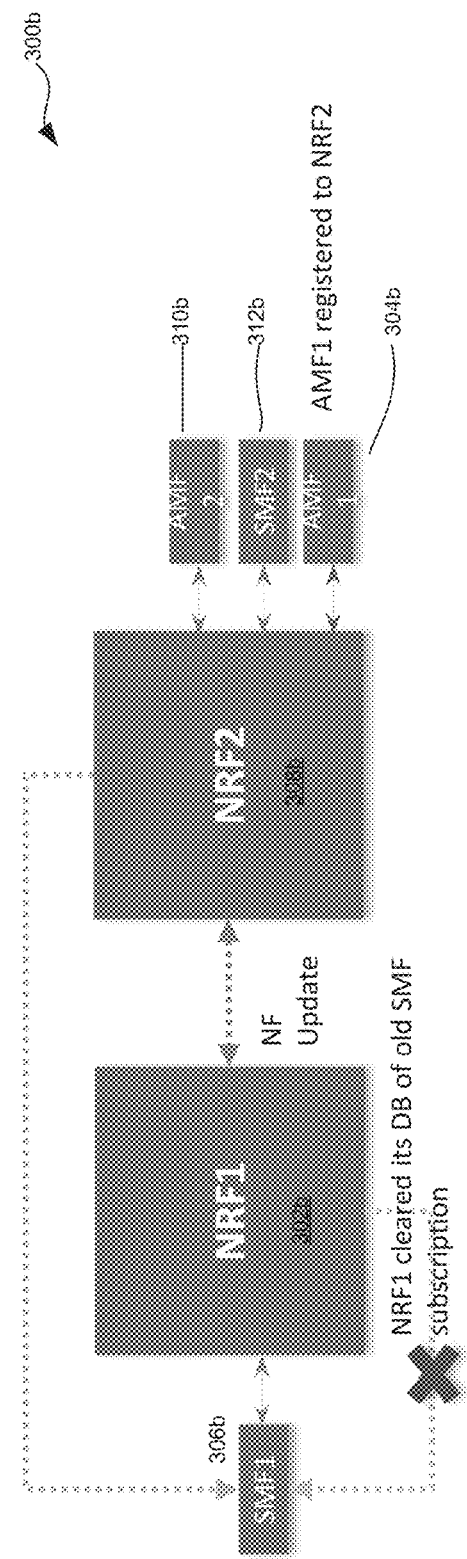
FIG. 3B is a block diagram that illustrates an example of a system of the 5G core network in which some aspects of the disclosed technology are implemented.

FIG. 3B is a block diagram that illustrates an example of a telecommunications network system in which at least some aspects of the disclosed technology are implemented. The telecommunications network system 300b can include two or more network repository functions (NRF1) 302b and (NRF2) 308b, at least one consumer network function, and at least one producer network function connected to each NRF. Access and Mobility Management Functions AMF1 304b and AMF2 310b are examples of PNFs. Session Management Functions SMF1 306b and SMF2 312b are examples of consumer network functions.

All network elements in FIG. 3B correspond to their counterparts in FIG. 3A. For example, the same network repository function NRF1 is depicted as 302a in the system 300a without the disclosed solution implemented and as 302b in system 300b with the disclosed solution implemented. Collectively, NRF1 in FIGS. 3A and 3B can be referred to by the reference number 302. Similarly, AMF1 304b in FIG. 3B corresponds to AMF1 304a in FIG. 3A. Collectively, AMF1 in FIGS. 3A and 3B can be referred to by the reference number 304. Similarly, SMF1 306b in FIG. 3B corresponds to SMF1 306a in FIG. 3A and NRF2 308b in FIG. 3B corresponds to NRF2 308a in FIG. 3A, respectively. Collectively, SMF1 in FIGS. 3A and 3B can be referred to by the reference number 306.

FIGS. 3A and 3B both depict a scenario wherein AMF1 304 has lost connectivity with NRF1 302 and registers on NRF2 308 before the Subscription Validity Timer expires. Thus, the subscription of SMF1 306 is still active on NRF1 302 during this time. NRF1 302 receives a notification via a Network Function Update (NF Update) message from NRF2 308 that AMF1 304 is now registered on NRF2 308. Without the disclosed invention, upon receiving this information, NRF1 302 silently deletes the subscription of SMF1 306. As such, SMF1 306 does not get any notification that AMF1 304 is active again on NRF2 308 since SMF1 306 does not have a subscription on NRF2 308 for AMF1 304. As such, any subsequent transactions from SMF1 306 to AMF1 304 fail until SMF1 306 initiates a new NRF discovery request to NRF1 302 after the Subscription Validity Timer expires.

In FIG. 3B, with the disclosed invention implemented, if AMF1 304b is no longer registered with NRF1 302b and the Subscription Validity Timer is still active, NRF1 302b, upon learning via an NF Update message from NRF2 308b that AMF1 304b is now registered to NRF2 308b, NRF1 302b sends a notification to SMF1 306b. SMF1 306b can start using AMF1 304b again. Optionally, NRF1 302b, upon receiving a subscription renewal request from SMF1 306b, forwards the request to NRF2 308b to which AMF1 304b is registered. NRF1 302b then deletes the old subscription and SMF1 306b can directly communicate with NRF2 308b.

Figure 4:
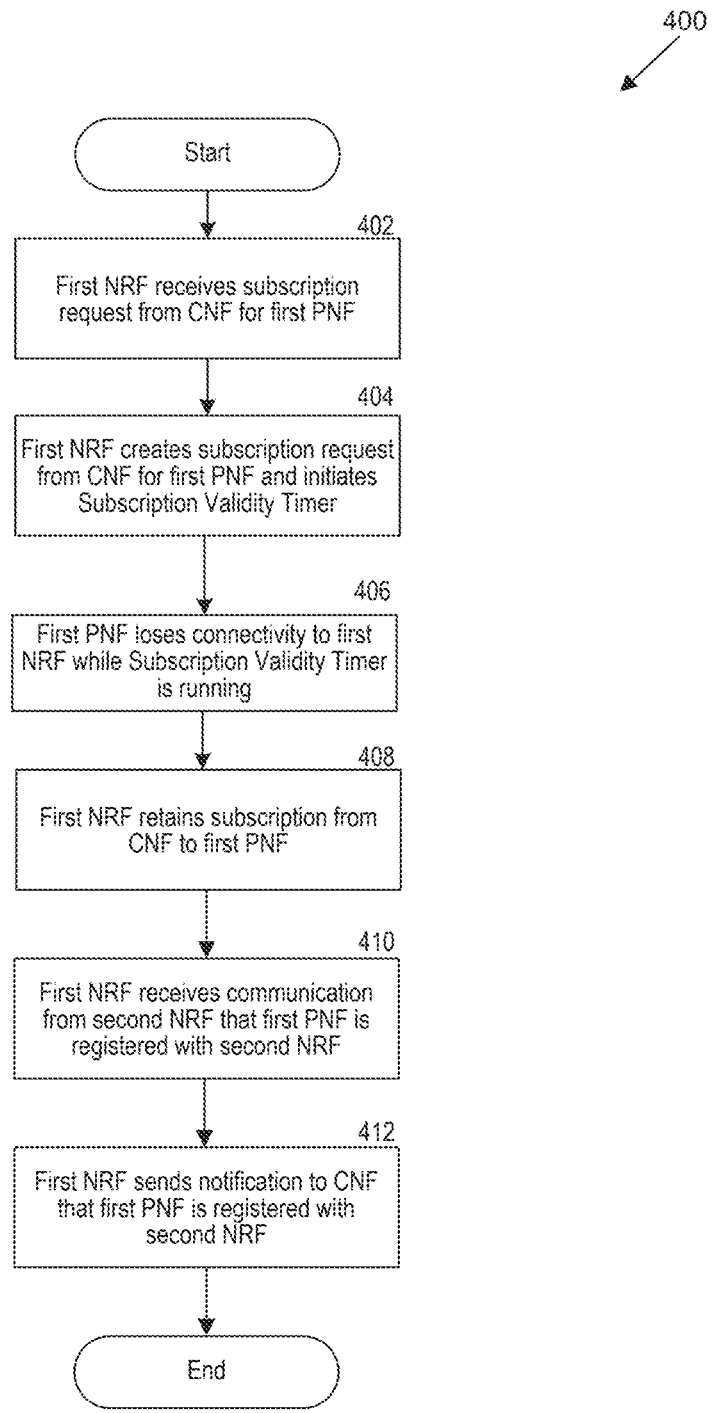
FIG. 4 is a flowchart that illustrates a telecommunications system for timely sending network function status notifications.

FIG. 4 is a flowchart that illustrates a telecommunications system for timely sending network function status notifications. The process 400 is performed by a system of a telecommunications network. The system includes a first NRF configured as a network element disposed in a 5G telecommunications network. The first NRF includes at least one hardware processor, at least one database, and at least one non-transitory memory storing instructions, which, when executed by the at least one hardware processor, cause the first NRF to perform the process 400.

At 402, the system can receive a subscription request from a consumer network function (CNF) communicatively coupled with the first NRF to receive notifications about a first PNF communicatively coupled with the first NRF. The CNF can be an SMF. The first PNF can be an AMF. The notifications can comprise information of the first PNF including: a registration status, a change in a registration status, a configuration, a change in a configuration, or any combination thereof. The first NRF determines the registration status of the first PNF as registered upon receiving a registration message or a heartbeat message within a network-operator-configurable period from the first PNF. The first NRF determines the registration status of the first PNF as unregistered upon not receiving a registration message or a heartbeat message within a network-operator-configurable period. Optionally, the first NRF, upon receiving communication from the second NRF that the first PNF is registered with the second NRF, can forward the subscription request from the CNF for the first PNF to the second NRF. Further, the first NRF, upon forwarding the subscription request from the CNF for the first PNF to the second NRF, can delete the subscription from its at least one database.

At 404, the system, upon receiving the subscription request, can cause the first NRF to create a subscription for the CNF to the first PNF in the at least one database of the first NRF and initiate a Subscription Validity Timer. Upon expiry of the Subscription Validity Timer, the first NRF can delete the subscription for the CNF to the first PNF from the at least one database. Optionally, the subscription notification contains at least two configurable fields. One configurable field can take one of two possible values: "Enable" or "Disable," and another configurable field includes an indication of a type of a network function.

At 406, the system can detect that first PNF has lost connectivity to the first NRF. At 408, the first NRF can retain the subscription for the CNF to the first PNF in the at least one database of the first NRF until expiry of the Subscription Validity Timer. Optionally, upon expiry of the Subscription Validity Timer, the first NRF can automatically renew the subscription in its at least one database for the CNF to the first PNF.

At 410, the first NRF can receive communication from a second NRF communicatively coupled to the first NRF regarding registration status as registered of at least one PNF connected to the second NRF. The at least one PNF registered with the second NRF can be the first PNF.

At 412, prior to expiration of the Subscription Validity Timer, the first NRF can send a notification to the CNF that the first PNF is registered with the second NRF.

Computer System

Figure 5:
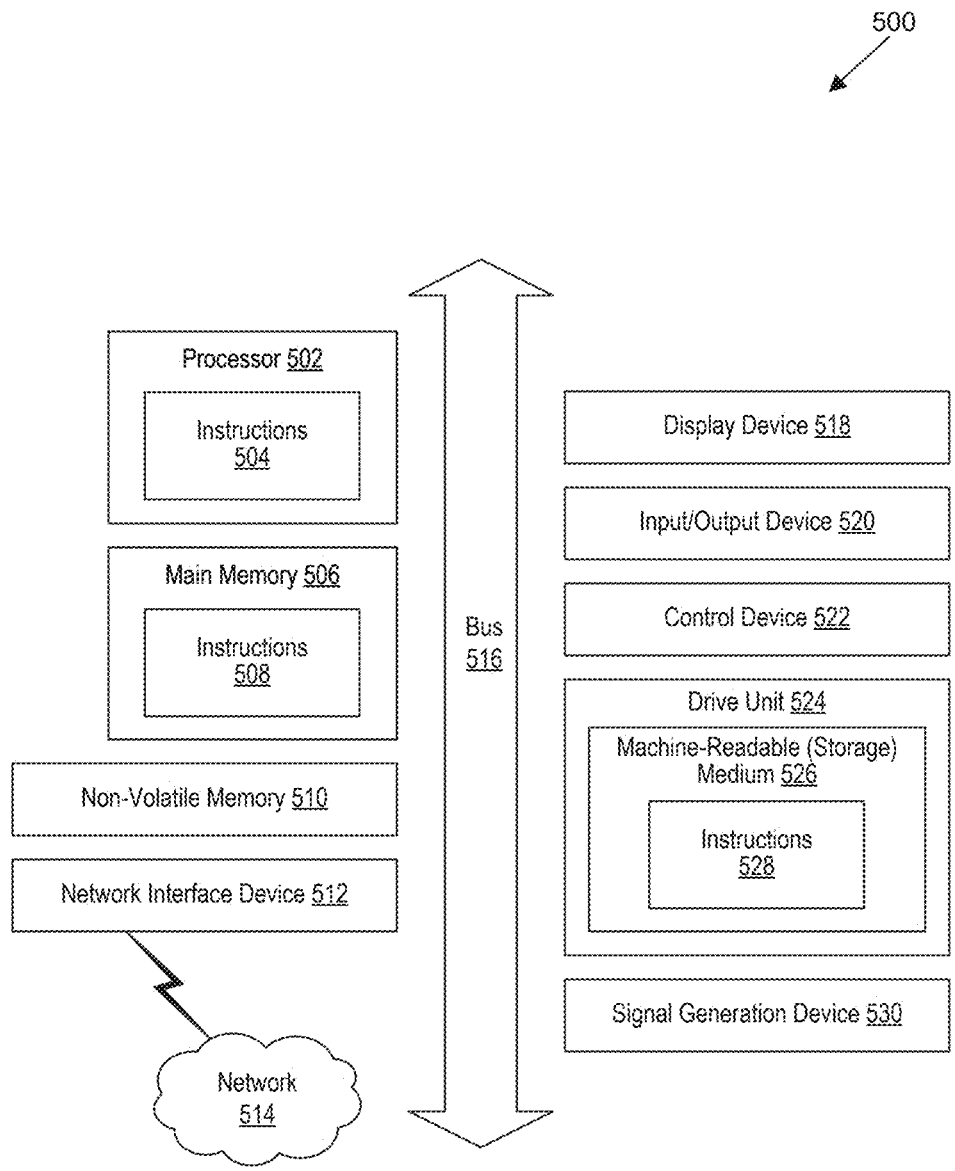
FIG. 5 is a block diagram that illustrates an example of a computer system in which at least some operations described herein can be implemented.

FIG. 5 is a block diagram that illustrates an example of a computer system 500 in which at least some operations described herein can be implemented. As shown, the computer system 500 can include: one or more processors 502, main memory 506, non-volatile memory 510, a network interface device 512, a video display device 518, an input/output device 520, a control device 522 (e.g., keyboard and pointing device), a drive unit 524 that includes a machine-readable (storage) medium 526, and a signal generation device 530 that are communicatively connected to a bus 516. The bus 516 represents one or more physical buses and/or point-to-point connections that are connected by appropriate bridges, adapters, or controllers. Various common components (e.g., cache memory) are omitted from FIG. 5 for brevity. Instead, the computer system 500 is intended to illustrate a hardware device on which components illustrated or described relative to the examples of the figures and any other components described in this specification can be implemented.

The computer system 500 can take any suitable physical form. For example, the computing system 500 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 500. In some implementations, the computer system 500 can be an embedded computer system, a system-on-chip (SOC), a single-board computer system (SBC), or a distributed system such as a mesh of computer systems, or it can include one or more cloud components in one or more networks. Where appropriate, one or more computer systems 500 can perform operations in real time, in near real time, or in batch mode.

The network interface device 512 enables the computing system 500 to mediate data in a network 514 with an entity that is external to the computing system 500 through any communication protocol supported by the computing system 500 and the external entity. Examples of the network interface device 512 include a network adapter card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 506, non-volatile memory 510, machine-readable medium 526) can be local, remote, or distributed. Although shown as a single medium, the machine-readable medium 526 can include multiple media (e.g., a centralized/distributed database and/or associated caches and servers) that store one or more sets of instructions 528. The machine-readable medium 526 can include any medium that is capable of storing, encoding, or carrying a set of instructions for execution by the computing system 500. The machine-readable medium 526 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory 510, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 504, 508, 528) set at various times in various memory and storage devices in computing device(s). When read and executed by the processor 502, the instruction(s) cause the computing system 500 to perform operations to execute elements involving the various aspects of the disclosure.

Remarks

The terms "example," "embodiment," and "implementation" are used interchangeably. For example, references to "one example" or "an example" in the disclosure can be, but not necessarily are, references to the same implementation; and such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described that can be exhibited by some examples and not by others. Similarly, various requirements are described that can be requirements for some examples but not for other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense—that is to say, in the sense of "including, but not limited to." As used herein, the terms "connected," "coupled," and any variants thereof mean any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number, respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms either in this application or in a continuing application.

I claim:

1. A system of a telecommunications network, the system comprising:
a first network repository function (NRF) configured as a network element disposed in a 5G telecommunications network, the first NRF including:
at least one hardware processor;
at least one database; and
at least one non-transitory memory storing instructions, which, when executed by the at least one hardware processor, cause the first NRF to:
receive a subscription request from a consumer network function (CNF) communicatively coupled with the first NRF to receive a notification about a first producer network function (PNF) communicatively coupled with the first NRF,
wherein the notification comprises information of the first PNF including: a registration status, a change in a registration status, a configuration, a change in a configuration, or any combination thereof,
wherein the first NRF determines a registration status of the first PNF as registered upon receiving a registration message or a heartbeat message within a network-operator-configurable period from the first PNF, and wherein the first NRF determines a registration status of the first PNF as unregistered upon not receiving a registration message or a heartbeat message within a network-operator-configurable period;

upon receiving the subscription request, create a subscription for the CNF to the first PNF in the at least one database of the first NRF and initiate a Subscription Validity Timer, wherein, upon expiry of the Subscription Validity Timer, the first NRF deletes the subscription for the CNF to the first PNF from the at least one database;

retain the subscription for the CNF to the first PNF in the at least one database of the first NRF until the Subscription Validity Timer expires;

receive communication from a second NRF communicatively coupled to the first NRF regarding registration status as registered of at least one PNF connected to the second NRF, wherein the at least one PNF registered with the second NRF is the first PNF; and send a notification to the CNF that the first PNF is registered with the second NRF, wherein the notification is sent prior to expiration of the Subscription Validity Timer.

2. The system of claim 1, wherein the first NRF, upon receiving communication from the second NRF that the first PNF is registered with the second NRF, forwards the subscription request from the CNF for the first PNF to the second NRF.

3. The system of claim 2, wherein the first NRF, upon forwarding the subscription request from the CNF for the first PNF to the second NRF, deletes the subscription from the at least one database of the first NRF.

4. The system of claim 1, wherein the notification includes at least two configurable fields, wherein at least one configurable field has one of two values: "Enable" or "Disable," and wherein at least one configurable field includes an indication of a type of a network function.

5. The system of claim 1, wherein, upon expiry of the Subscription Validity Timer, the first NRF automatically renews the subscription in the at least one database for the CNF to the first PNF.

6. The system of claim 1, further caused to:

upon receiving communication by the first NRF from the second NRF that the first PNF is registered with the second NRF, forward the subscription request from the CNF for the first PNF to the second NRF, wherein the CNF is a session management function (SMF).

7. The system of claim 1, wherein the first NRF, upon receiving communication from the second NRF that the first PNF is registered with the second NRF, forwards the subscription request from the CNF for the first PNF to the second NRF, and wherein the first PNF is an access and mobility management function (AMF).

8. A non-transitory, computer-readable storage medium comprising instructions recorded thereon, wherein the instructions, when executed by at least one data processor of a system, cause the system to:

receive a subscription request from a consumer network function (CNF) communicatively coupled with a first network repository function (NRF) to receive a notification about a producer network function (PNF) communicatively coupled with the first NRF, wherein the notification comprises information of the PNF including a registration status, a change in a registration status, a configuration, a change in a configuration, or any combination thereof, wherein the first NRF determines a registration status of the PNF as registered upon receiving a registration message or a heartbeat message within a network-operator-configurable period from the PNF, and wherein the first NRF determines a registration status of the PNF as unregistered upon not receiving a registration message or a heartbeat message within a network-operator-configurable period;

upon receiving the subscription request, create a subscription for the CNF to the PNF in the at least one database of the first NRF and initiate a Subscription Validity Timer, wherein, upon expiry of the Subscription Validity Timer, the first NRF deletes the subscription for the CNF to the PNF from the at least one database of the first NRF;

retain the subscription for the CNF to the PNF in the at least one database of the first NRF until the Subscription Validity Timer expires;

receive communication from a second NRF communicatively coupled to the first NRF indicating that the PNF is connected to the second NRF; and send a notification to the CNF that the PNF is registered with the second NRF, wherein the notification is sent prior to expiration of the Subscription Validity Timer.

9. The non-transitory, computer-readable storage medium of claim 8, wherein the first NRF, upon receiving communication from the second NRF that the PNF is registered with the second NRF, is caused to forward the subscription request from the CNF for the PNF to the second NRF.

10. The non-transitory, computer-readable storage medium of claim 9, wherein the first NRF, upon forwarding the subscription request from the CNF for the PNF to the second NRF, is caused to delete the subscription from the at least one database of the first NRF.

11. The non-transitory, computer-readable storage medium of claim 8, wherein the notification includes at least two configurable fields, wherein at least one configurable field has one of two possible values: "Enable" or "Disable," and wherein at least one configurable field includes an indication of a type of a network function.

12. The non-transitory, computer-readable storage medium of claim 8, wherein, upon expiry of the Subscription Validity Timer, the first NRF is caused to automatically renew the subscription in the at least one database of the first NRF for the CNF to the PNF.

13. The non-transitory, computer-readable storage medium of claim 8, wherein the first NRF, upon receiving communication from the second NRF that the PNF is registered with the second NRF, is caused to forward the subscription request from the CNF for the PNF to the second NRF, and wherein the CNF is a session management function (SMF).

14. The non-transitory, computer-readable storage medium of claim 8, wherein the first NRF, upon receiving communication from the second NRF that the PNF is registered with the second NRF, is caused to forward the subscription request from the CNF for the PNF to the second NRF, and wherein the PNF is an access and mobility management function (AMF).

15. A method for managing subscription notifications by a first network repository function (NRF) configured as a network element disposed in a 5G telecommunications network, the method comprising:

receiving a subscription request from a consumer network function (CNF) communicatively coupled with the first NRF to receive a notification about a first producer network function (PNF) communicatively coupled with the first NRF, wherein the notification comprises information related to a registration or configuration of the first PNF, wherein the first NRF is caused to determine a registration status of the first PNF as registered upon receiving a registration message or a heartbeat message within a network-operator-configurable period from the first PNF, and wherein the first NRF is caused to determine a registration status of the first PNF as unregistered upon not receiving a registration message or a heartbeat message within a network-operator-configurable period;

upon receiving the subscription request, creating a subscription for the CNF to the first PNF in the at least one database of the first NRF and initiating a Subscription Validity Timer, wherein, upon expiry of the Subscription Validity Timer, the first NRF deletes the subscription for the CNF to the first PNF from the at least one database of the first NRF;

retaining the subscription for the CNF to the first PNF in the at least one database of the first NRF until the Subscription Validity Timer expires;

receiving communication from a second NRF communicatively coupled to the first NRF regarding a registration status as registered of at least one PNF connected to the second NRF, wherein the at least one PNF registered with the second NRF is the first PNF; and sending a notification to the CNF that the first PNF is registered with the second NRF, wherein the notification is sent prior to expiration of the Subscription Validity Timer.

16. The method of claim 15, further comprising:

upon receiving communication from the second NRF that the first PNF is registered with the second NRF, forwarding the subscription request from the CNF for the first PNF to the second NRF.

17. The method of claim 16, further comprising the first NRF, upon forwarding the subscription request from the CNF for the first PNF to the second NRF, deleting the subscription from the at least one database of the first NRF.

18. The method of claim 15, wherein the notification includes at least two configurable fields, wherein at least one configurable field has one of two possible values: "Enable" or "Disable," and wherein at least one configurable field includes an indication of a type of a network function.

19. The method of claim 15, further comprising the first NRF, upon receiving communication from the second NRF that the first PNF is registered with the second NRF, forwarding the subscription request from the CNF for the first PNF to the second NRF, wherein the CNF is a session management function (SMF).

20. The method of claim 15, further comprising the first NRF, upon receiving communication from the second NRF that the first PNF is registered with the second NRF, forwarding the subscription request from the CNF for the first PNF to the second NRF, wherein the first PNF is an access and mobility management function (AMF).

* * * * *